US007012137B2

(12) United States Patent
Clément et al.

(10) Patent No.: US 7,012,137 B2
(45) Date of Patent: Mar. 14, 2006

(54) PHTHALIMIDYL AZO DYES, PROCESS FOR THE PREPARATION THEREOF AND THE USE THEREOF

(75) Inventors: Antoine Clément, Basel (CH); Jean-Claude Wilhelm, Knoeringue (FR); Alfons Arquint, Basel (CH); Urs Lauk, Zürich (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 346 days.

(21) Appl. No.: 10/467,265

(22) PCT Filed: Jan. 29, 2002

(86) PCT No.: PCT/EP02/00903

§ 371 (c)(1),
(2), (4) Date: Aug. 4, 2003

(87) PCT Pub. No.: WO02/074864

PCT Pub. Date: Sep. 26, 2002

(65) Prior Publication Data

US 2004/0116681 A1   Jun. 17, 2004

(30) Foreign Application Priority Data

Feb. 7, 2001   (EP)   ................... 01810128

(51) Int. Cl.
*C09B 29/036* (2006.01)
*C09B 29/09* (2006.01)
*C09B 67/22* (2006.01)
*D06P 1/18* (2006.01)

(52) U.S. Cl. .............. 534/789; 8/456; 8/639; 8/662; 8/696

(58) Field of Classification Search ............. 534/789; 8/456, 639, 662, 696
See application file for complete search history.

(56) References Cited

U.S. PATENT DOCUMENTS 3,980,634 A     9/1976   Weaver ............... 260/152
6,555,664 B1 *  4/2003   Lauk et al. .......... 534/789

FOREIGN PATENT DOCUMENTS

WO   00/40656   7/2000

OTHER PUBLICATIONS

Chemical Abstract vol. 85, No. 48260s (1976) for JP 51029577.

* cited by examiner

*Primary Examiner*—Fiona T. Powers
(74) *Attorney, Agent, or Firm*—Kevin T. Mansfield

(57) ABSTRACT

The present invention relates to dyes of formula (I) wherein R is hydrogen or bromine, $R_1$ is hydrogen, methyl or —NHCO—$C_1$–$C_4$alkyl, $R_2$ is $C_1$–$C_4$alkyl substituted by $C_1$–$C_4$alkoxy and $R_3$ has, independently of $R_2$, any of the meanings of $R_2$, and to the process for the preparation thereof and to the use thereof in dyeing or printing semi-synthetic and especially synthetic hydrophobic fiber materials, especially textile materials.

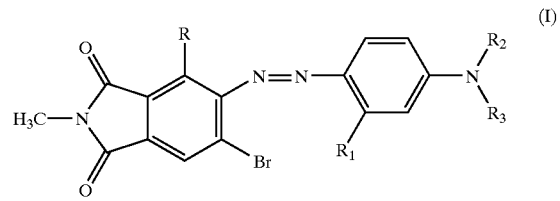

(I)

11 Claims, No Drawings

PHTHALIMIDYL AZO DYES, PROCESS FOR THE PREPARATION THEREOF AND THE USE THEREOF

The present invention relates to disperse dyes having an N-methyl-phthalimide-diazo component and an aniline coupling component, to processes for the preparation of such dyes and to the use thereof in dyeing or printing semi-synthetic and especially synthetic hydrophobic fibre materials, especially textile materials.

Disperse azo dyes having an N-alkyl-phthalimide-diazo component and an aniline coupling component have been known for a long time and are used in dyeing hydrophobic fibre materials. It has, however, been found that the dyeings or prints obtained using the currently known dyes do not in all cases satisfy today's requirements, especially in respect of fastness to washing and fastness to perspiration. There is therefore a need for new dyes that especially have good washing fastness properties.

It has now been found, surprisingly, that the dyes according to the invention meet the criteria given above to a considerable degree.

The present invention accordingly relates to disperse dyes that yield dyeings having a high degree of fastness to washing and to perspiration and that, in addition, have good build-up characteristics both in the exhaust and thermosol processes and in textile printing. The dyes are also suitable for discharge printing.

The dyes according to the invention correspond to formula

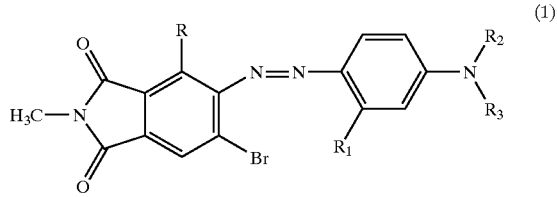
(1)

wherein
R is hydrogen or bromine,
$R_1$ is hydrogen, methyl or —NHCO—$C_1$–$C_4$alkyl,
$R_2$ is $C_1$–$C_4$alkyl substituted by $C_1$–$C_4$alkoxy and
$R_3$ has, independently of $R_2$, any of the meanings of $R_2$.
$R_1$ is preferably —NHCO—$C_1$–$C_4$alkyl.
$C_1$–$C_4$alkyl in the radical —NHCO—$C_1$–$C_4$alkyl is methyl, ethyl, n-propyl, isopropyl, n-butyl, isobutyl, sec-butyl or tert-butyl, especially methyl.
$R_2$ and $R_3$ as $C_1$–$C_4$alkyl are, each independently of the other, methyl, ethyl, n-propyl, isopropyl, n-butyl, isobutyl, sec-butyl or tert-butyl.
$R_2$ and $R_3$ preferably have the same meaning.
$R_2$ and $R_3$ are especially ethyl.
$C_1$–$C_4$Alkoxy as substituent of $C_1$–$C_4$alkyl in $R_2$ and $R_3$ is, for example, methoxy, ethoxy or propoxy, especially methoxy.

Special preference is given to dyes of formulae

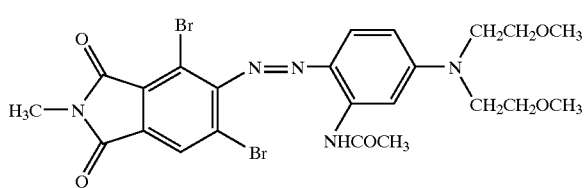
(2)

and

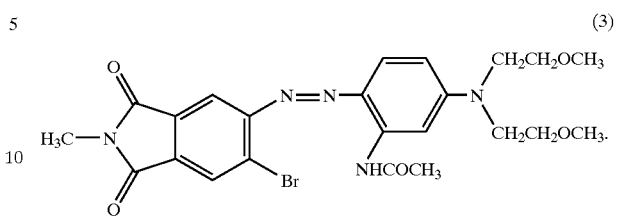
(3)

The present invention relates also to the process for the preparation of the dyes of formula (1) according to the invention.

The dyes are prepared, for example, by nitration of a phthalimide of formula

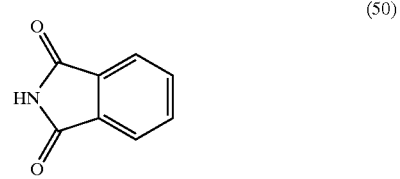
(50)

in the acid range, as described, for example, on page 459 in Organic Synthesis, Collective Volume 2, (a Revised Edition of Annual Volumes X–XIX), J.Wiley & Sons, followed by alkylation of the resulting nitro compound, for example in accordance with a method described in Journal of Organic Chemistry 32 (1967) on page 1923, paragraph 3, and, for example after reductive treatment described in Bull. Soc. Chim. de France 1957 on page 569, conversion into an intermediate of formula

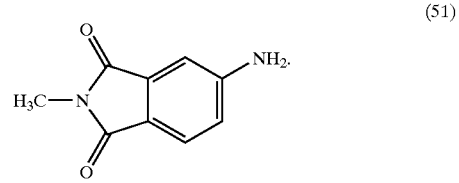
(51)

Using generally known methods, the intermediate of formula (51) is mono- or di-halogenated and the resulting compound is then, in an acid medium, diazotised and coupled to a compound of formula

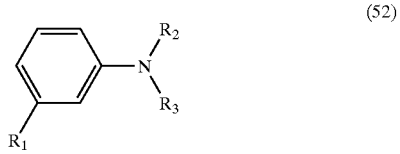
(52)

wherein $R_1$, $R_2$ and $R_3$ have the definitions and preferred meanings given above.

The halogenation is carried out, for example, by reacting the compound of formula (51) first with sodium acetate in acetic acid and then with bromine in the same medium to form the corresponding mono- or di-bromo compound.

The diazotisation of the compound of formula (51) is likewise carried out in a manner known per se, for example with sodium nitrite in an acidic, for example hydrochloric-acid-containing or sulfuric-acid-containing, aqueous medium. The diazotisation may, however, also be carried out using other diazotisation agents, e.g. with nitrosylsulfuric acid. In the diazotisation, an additional acid may be present in the reaction medium, e.g. phosphoric acid, sulfuric acid, acetic acid, propionic acid, hydrochloric acid or mixtures of such acids, e.g. mixtures of propionic acid and acetic acid. The diazotisation is advantageously carried out at temperatures of from −10 to 30° C., for example from −10° C. to room temperature.

The coupling of the diazotised compound of formula (51) to the coupling component of formula (52) is likewise effected in known manner, for example in an acidic, aqueous or aqueous-organic medium, advantageously at temperatures of from −10 to 30° C., especially below 10° C. Examples of acids used are hydrochloric acid, acetic acid, propionic acid, sulfuric acid and phosphoric acid.

The diazo components of formula (51) and the coupling components of formula (52) are known or can be prepared in a manner known per se.

The present invention relates also to dye mixtures comprising at least one azo dye of formula (1) and at least one azo dye of formula

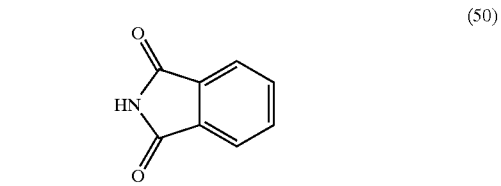

(4)

wherein
R$_1$ is hydrogen, methyl or —NHCO—C$_1$–C$_4$alkyl, R$_2$ is C$_1$–C$_4$alkyl, it being possible for the alkyl chain, from C$_2$ upwards, optionally to be interrupted by an oxygen atom, and R$_3$ has, independently of R$_2$, any of the meanings of R$_2$.

Preference is given to dye mixtures that comprise at least one azo dye of formula (1) and the azo dyes of formulae Special preference is given to dye mixtures that comprise the azo dyes of formulae (2), (5) and (6).

The azo dyes of formulae (1), (5) and (6) can be prepared analogously to known compounds using generally known methods.

The azo dyes of formula (4) used in accordance with the invention are prepared, for example, by nitration of a phthalimide of formula

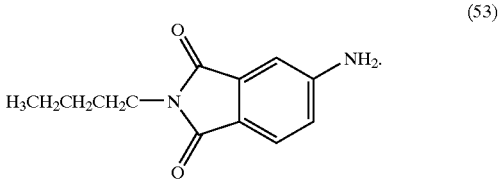

(50)

in the acid range, as described, for example, on page 459 in Organic Synthesis, Collective Volume 2, (a Revised Edition of Annual Volumes X–XIX), J.Wiley & Sons, followed by alkylation of the resulting nitro compound, for example in accordance with a method described in Journal of Organic Chemistry 32 (1967) on page 1923, paragraph 3, and, for example after reductive treatment described on page 569 in Bull. Soc. Chim. de France 1957, conversion into an intermediate of formula

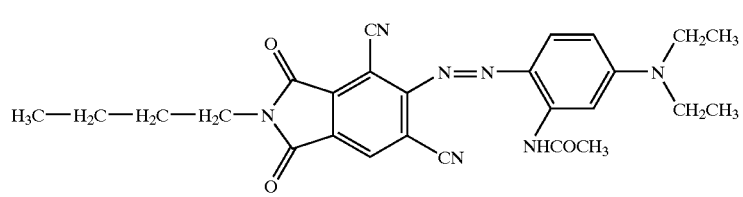

(53)

Using generally known methods, the intermediate of formula (53) is dihalogenated and then, in an acid medium, diazotised and coupled to a compound of formula

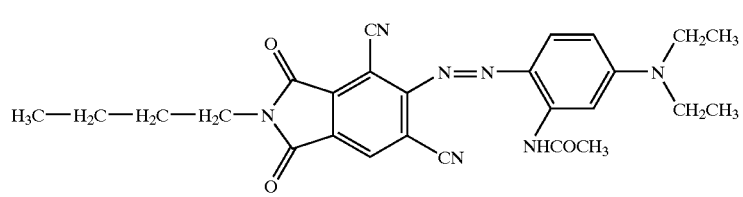

(5)

and

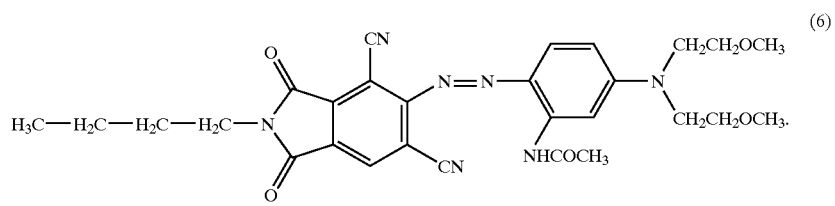

(6)

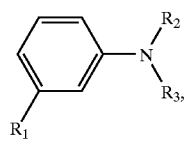
(54)

wherein $R_1$, $R_2$ and $R_3$ have the definitions and preferred meanings given above.

The reaction to form the final dyes is carried out by replacement of the two bromine atoms by cyano groups using methods known per se, for example using CuCN or mixtures of CuCN and an alkali metal cyanide in a solvent, for example dimethylformamide, dimethyl sulfoxide, dimethylacetamide, N-vinylpyrrolidone, sulfolane or pyridine.

The halogenation is carried out, for example, by reacting the compound of formula (53) first with sodium acetate in acetic acid and then with bromine in the same medium to form the corresponding di-bromo compound.

The diazotisation of the compound of formula (53) is likewise carried out in a manner known per se, for example with sodium nitrite in an acidic, for example hydrochloric-acid-containing or sulfuric-acid-containing, aqueous medium. The diazotisation may, however, also be carried out using other diazotisation agents, e.g. with nitrosylsulfuric acid. In the diazotisation, an additional acid may be present in the reaction medium, e.g. phosphoric acid, sulfuric acid, acetic acid, propionic acid, hydrochloric acid or mixtures of such acids, e.g. mixtures of propionic acid and acetic acid. The diazotisation is advantageously carried out at temperatures of from –10 to 30° C., for example from –10° C. to room temperature.

The coupling of the diazotised compound of formula (53) to the coupling component of formula (54) is likewise effected in known manner, for example in an acidic, aqueous or aqueous-organic medium, advantageously at temperatures of from –10 to 30° C., especially below 10° C. Examples of acids used are hydrochloric acid, acetic acid, propionic acid, sulfuric acid and phosphoric acid.

The diazo components of formula (53) and the coupling components of formula (54) are known or can be prepared in a manner known per se.

The dye mixtures according to the invention comprising the azo dyes defined hereinbefore can be prepared, for example, by simply mixing the individual dyes, for example by mixing the azo dyes of formulae (2), (5) and (6).

The amounts of the individual dyes in the dye mixtures according to the invention can vary within a wide range, for example from 30 to 55 parts by weight, especially from 34 to 50 parts by weight, of the azo dye of formula (1) to from 45 to 70 parts by weight, especially from 50 to 66 parts by weight, of the azo dye of formula (4), based on 100 parts by weight of the dye mixture according to the invention.

The dye mixtures according to the invention preferably contain from 34 to 50% by weight of the azo dye of formula (2), from 25 to 33% by weight of the azo dye of formula (5) and from 25 to 33% by weight of the azo dye of formula (6), based on 100% by weight of the dye mixture according to the invention.

The dyes and dye mixtures according to the invention may be used for dyeing or printing semi-synthetic and especially synthetic hydrophobic fibre materials, especially textile materials. Textile materials composed of blend fabrics that comprise such semi-synthetic or synthetic hydrophobic fibre materials can also be dyed or printed using the dyes or dye mixtures according to the invention.

Semi-synthetic fibre materials that come into consideration are, especially, cellulose 2½-acetate and cellulose triacetate.

Synthetic hydrophobic fibre materials consist especially of linear, aromatic polyesters, for example those of terephthalic acid and glycols, especially ethylene glycol, or condensation products of terephthalic acid and 1,4-bis(hydroxymethyl)cyclohexane; of polycarbonates, e.g. those of α,α-dimethyl-4,4-dihydroxy-diphenylmethane and phosgene, and of fibres based on polyvinyl chloride and on polyamide.

The application of the dyes and dye mixtures according to the invention to the fibre materials is effected in accordance with known dyeing methods. For example, polyester fibre materials are dyed in the exhaust process from an aqueous dispersion in the presence of customary anionic or non-ionic dispersants and, optionally, customary swelling agents (carriers) at temperatures of from 80 to 140° C. Cellulose 2½-acetate is dyed preferably at from 65 to 85° C. and cellulose triacetate at temperatures of from 65 to 115° C.

The dyes and dye mixtures according to the invention will not colour wool and cotton present at the same time in the dyebath or will colour such materials only slightly (very good reservation) so that they can also be used satisfactorily in the dyeing of polyester/wool and polyester/cellulosic fibre blend fabrics.

The dyes and dye mixtures according to the invention are suitable for dyeing in accordance with the thermosol process, in the exhaust process and for printing processes.

In such processes, the said fibre materials can be in a variety of processing forms, e.g. in the form of fibres, yarns or nonwoven, woven or knitted fabrics.

It is advantageous to convert the dyes or dye mixtures according to the invention into a dye preparation prior to use. For this purpose, the dye is ground so that its particle size is on average from 0.1 to 10 microns. Grinding can be carried out in the presence of dispersants. For example, the dried dye is ground together with a dispersant or kneaded into a paste form together with a dispersant and then dried in vacuo or by atomisation. After adding water, the resulting preparations can be used to prepare printing pastes and dyebaths.

For printing, the customary thickeners will be used, e.g. modified or unmodified natural products, for example alginates, British gum, gum arabic, crystal gum, locust bean flour, tragacanth, carboxymethyl cellulose, hydroxyethyl cellulose, starch or synthetic products, for example polyacrylamides, polyacrylic acid or copolymers thereof, or polyvinyl alcohols.

The dyes and dye mixtures according to the invention impart to the said materials, especially to polyester materials, level colour shades having very good in-use fastness properties such as, especially, good fastness to light, fastness to heat setting, fastness to pleating, fastness to chlorine, and wet fastness, e.g. fastness to water, to perspiration and to washing; the finished dyeings are further characterised by very good fastness to rubbing. Special emphasis should be given to the good fastness properties of the dyeings obtained with respect to perspiration and, especially, to washing.

The dyes and dye mixtures according to the invention can also be used satisfactorily in producing mixed shades together with other dyes.

Furthermore, the dyes and dye mixtures according to the invention are also well suited to dyeing hydrophobic fibre materials from supercritical $CO_2$.

The present invention relates to the above-mentioned use of the dyes and dye mixtures according to the invention as well as to a process for the dyeing or printing of semi-synthetic or synthetic hydrophobic fibre materials, especially textile materials, in which process a dye according to the invention is applied to the said materials or incorporated into them. The said hydrophobic fibre materials are preferably textile polyester materials. Further substrates that can be treated by the process according to the invention and preferred process conditions can be found above in the more detailed description of the use of the dyes according to the invention.

The invention relates also to hydrophobic fibre materials, preferably polyester textile materials, dyed or printed by the said process.

The dyes according to the invention are, in addition, suitable for modern reproduction processes, e.g. thermotransfer printing.

The Examples that follow serve to illustrate the invention. Parts therein are parts by weight and percentages are percentages by weight, unless otherwise indicated. Temperatures are given in degrees Celsius. The relationship between parts by weight and parts by volume is the same as between grams and cubic centimeters.

EXAMPLE 1

26.25 g of glacial acetic acid are introduced into a laboratory reaction apparatus and, over the course of 3 minutes, 1.67 g of the compound of formula

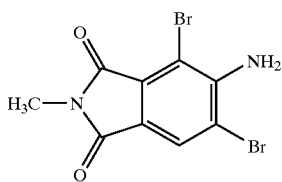
(55)

are introduced at room temperature. The resulting greenish suspension is stirred for 5 minutes and then, over the course of 7 minutes, 0.54 g of 98% sulfuric acid is added; stirring is carried out for 10 minutes. Then, over the course of 20 minutes, with cooling at 15–20° C., 1.86 g of 40% nitrosylsulfuric acid are added dropwise to the reaction mixture and stirring is carried out for 1 hour at that temperature. After the reaction is complete, the mixture is added dropwise, over the course of 10 minutes, to a mixture consisting of 6.30 g of glacial acetic acid, 0.58 g of 32% hydrochloric acid, 11.00 g of ice-water and 5.00 g of a 31.1% aqueous solution of the compound of formula

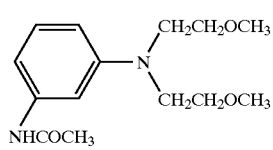
(56)

at a temperature of 0–5° C. and is stirred for 120 minutes. Then, over the course of 10 minutes, 15.00 g of ice-water are added dropwise; the resulting red suspension is filtered with suction, washed with deionised water and dried.

There are obtained 2.10 g of the dye of formula

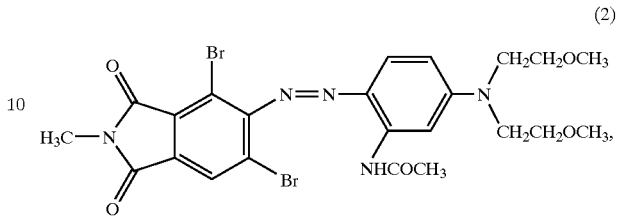
(2)

which dyes polyester a red-brown shade.

EXAMPLE 2

1 part by weight of the dye of formula

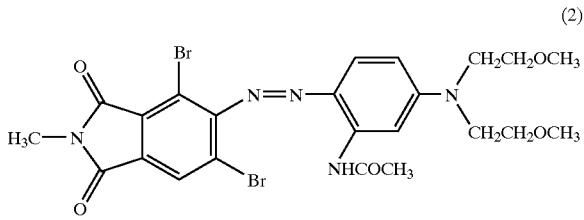
(2)

is ground in a sand mill, together with 17 parts by weight of water and 2 parts by weight of a commercially available dispersant of the dinaphthylmethanedisulfonate type, and converted into a 5% aqueous dispersion.

Using that formulation, a 1% dyeing (based on the dye and the substrate) is produced on woven polyester fabric by the high-temperature exhaust process at 130° C. and is cleaned reductively. The red-brown dyeing obtained in that manner has very good in-use fastness properties, especially excellent fastness to washing.

The same good fastness properties can be achieved when woven polyester fabric is dyed in the thermosol process (10 g/liter of dye, liquor pick-up 50%, fixing temperature 210° C.).

EXAMPLE 3

1 part by weight of a dye mixture comprising 0.42 part by weight of the dye of formula

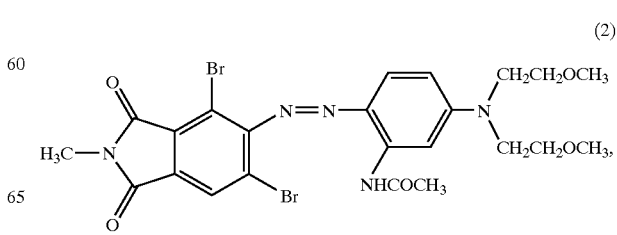
(2)

0.29 part by weight of the dye of formula

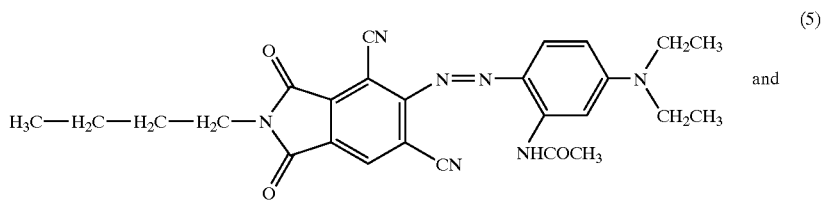 (5)

and 0.29 part by weight of the dye of formula

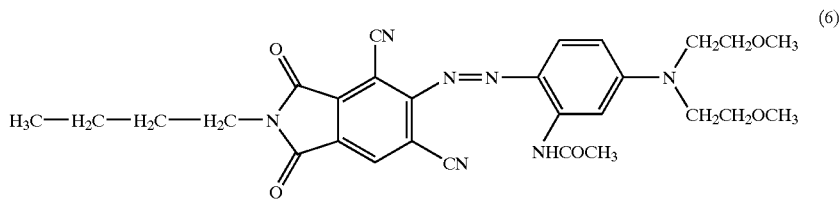 (6)

is ground in a sand mill, together with 17 parts by weight of water and 2 parts by weight of a commercially available dispersant of the dinaphthylmethanedisulfonate type, and converted into a 5% aqueous dispersion.

Using that formulation, a 1% dyeing (based on the dye and the substrate) is produced on woven polyester fabric by the high-temperature exhaust process at 130° C. and is cleaned reductively. The brown-black dyeing obtained in that manner has very good in-use fastness properties, especially excellent fastness to washing.

The same good fastness properties can be achieved when woven polyester fabric is dyed in the thermosol process (10 g/liter of dye, liquor pick-up 50%, fixing temperature 210° C.).

What is claimed is:

1. A dye of formula

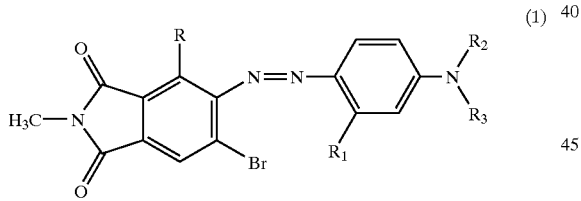 (1)

wherein R is hydrogen or bromine, $R_1$ is hydrogen, methyl or —NHCO—$C_1$–$C_4$alkyl, $R_2$ is $C_1$–$C_4$alkyl substituted by $C_1$–$C_4$alkoxy and $R_3$ has, independently of $R_2$, any of the meanings of $R_2$.

2. A dye according to claim 1, wherein $R_1$ is —NHCO—$C_1$–$C_4$alkyl.

3. A dye according to claim 1, wherein $R_2$ and $R_3$ have the same meaning and are the radical —$CH_2CH_2$—$OCH_3$.

4. Dye according to claim 1 of formula

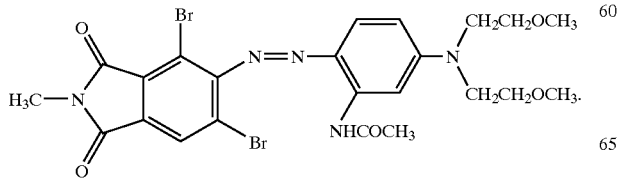 (2)

5. Dye according to claim 1 of formula

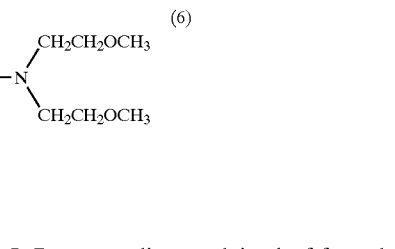 (3)

6. A process for the preparation of a dye of formula (1) according to claim 1, in which process a phthalimide of formula

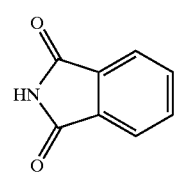 (50)

is nitrated in the acid range, the resulting nitro compound is then alkylated and, by means of reductive treatment, converted into an intermediate of formula

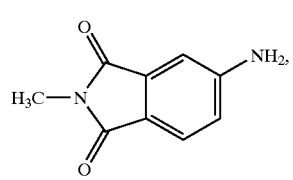 (51)

the intermediate of formula (51) is mono- or di-halogenated in an acid medium, and the resulting compound is then diazotised and is coupled to a compound of formula

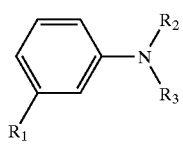 (52)

wherein $R_1$, $R_2$ and $R_3$ are as defined for formula (1).

7. A dye mixture comprising at least one azo dye of formula (1) according to claim 1 and at least one azo dye of formula

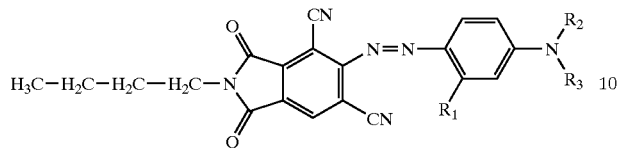

(4)

wherein $R_1$ is hydrogen, methyl or —NHCO—$C_1$–$C_4$alkyl, $R_2$ is $C_1$–$C_4$alkyl, it being possible for the alkyl chain, from $C_2$ upwards, optionally to be interrupted by an oxygen atom, and $R_3$ has, independently of $R_2$, any of the meanings of $R_2$.

8. A process for dyeing or printing semi-synthetic or synthetic hydrophobic fibre materials, comprising applying to the said materials or incorporating into said materials a dye of formula (1) according to claim 1.

9. A semi-synthetic or synthetic hydrophobic fibre material, dyed or printed by the process according to claim 8.

10. A dye according to claim 2, wherein $R_2$ and $R_3$ have the same meaning and are the radical —$CH_2CH_2$—$OCH_3$.

11. A process for dyeing or printing semi-synthetic or synthetic hydrophobic fibre materials, comprising applying to the said materials or incorporating into said materials a dye mixture according to claim 7.

* * * * *